United States Patent [19]

Melchior

[11] 4,338,353
[45] Jul. 6, 1982

[54] METHOD FOR INCREASING THE STRENGTH OF A POROUS BODY

[75] Inventor: Bernd Melchior, Remscheid, Fed. Rep. of Germany

[73] Assignee: Imchemie Kunststoff GmbH, Wermelskirchen, Fed. Rep. of Germany

[21] Appl. No.: 222,088

[22] Filed: Jan. 2, 1981

Related U.S. Application Data

[63] Continuation of Ser. No. 66,435, Aug. 14, 1979, abandoned.

[30] Foreign Application Priority Data

Jun. 10, 1977 [DE] Fed. Rep. of Germany ....... 2726117

[51] Int. Cl.³ .................... B05D 1/18; B05D 3/00; B05D 3/06; B05D 3/12
[52] U.S. Cl. .................... 427/36; 427/44; 427/45.1; 427/55; 427/57; 427/294; 427/350; 427/379; 427/430.1
[58] Field of Search ............. 427/36, 44, 45.1, 55, 427/57, 294, 430.1, 350, 379

[56] References Cited

U.S. PATENT DOCUMENTS

| | | | |
|---|---|---|---|
| 2,174,887 | 10/1939 | Kiefer | 427/294 X |
| 3,407,088 | 10/1968 | Feibush et al. | 427/294 X |
| 3,663,261 | 5/1972 | Miettinen et al. | 427/294 X |

FOREIGN PATENT DOCUMENTS

| | | | |
|---|---|---|---|
| 1173380 | 7/1964 | Fed. Rep. of Germany | 427/294 |
| 1803730 | 5/1969 | Fed. Rep. of Germany | 427/294 |
| 1938077 | 2/1971 | Fed. Rep. of Germany | 427/294 |
| 2254146 | 9/1975 | Fed. Rep. of Germany | 427/294 |
| 1255969 | 12/1971 | United Kingdom | 427/294 |

*Primary Examiner*—Michael R. Lusignan
*Attorney, Agent, or Firm*—Clayton R. Johnson

[57] ABSTRACT

A method of treating a porous body to increase its strength and resistance to weathering that includes first removing gases and moisture from the porous body by applying a vacuum to a vessel containing the body, then filling the vessel with an impregnating liquid consisting of a hardenable (cureable) resin and hardner so that the body is completely immersed while the vacuum is being applied, then applying a positive pressure to the impregnating liquid in which the body is immersed until the impregnating liquid has penetrated into the porous body the desired amount, then draining the impregnating liquid from the vessel while maintaining the positive pressure and then initiating the hardening of the hardenable liquid while maintaining the positive pressure, part of the impregnating liquid on the surface of the body being removed prior to hardening of the impregnating liquid in the body.

18 Claims, 4 Drawing Figures

METHOD FOR INCREASING THE STRENGTH OF A POROUS BODY

This is a continuation of application Ser. No. 066,435 filed Aug. 14, 1979, now abandoned.

BACKGROUND OF THE INVENTION

With the method disclosed in West Germany DE-AS No. 22 54 146, the surface of the porous body remains completely impregnated with liquid, thereby giving the exterior of the body a dark and moist looking appearance even after the impregnating liquid has hardened. This external alteration of the body is undesirable, especially in the preservation of stones.

West German DE-OS No. 19 38 077 discloses the impregnation of clay stones with resin. This method has been used for the treatment of stone monuments to prevent exterior pollutants penetrating into the stone. However, where stone pollutants and water are present in the stone interior prior to treatment, the treatment prevents water entrained pollutants getting out of stone and as a result the pollutants are deposited to to a greater degree behind the protective layer and their destructive action increases at this point. Also during a frost, ice crystals may form behind the protective layer, which after awhile, causes the outer sealed layer to chip off.

To prevent the action referred to in the above paragraph, a prior art practice has been to impregnate the outer layer of stones with a medium which does not form a complete water and vapor barrier, but only has a water-repelling action, so that release of vapor from the stone continues to be possible. But as long as vapors can pass through the impregnated layer from the inside out, invasion of harmful gases is also permitted, so that protection of the stone is conditional.

Also it has been proposed to impregnate a stone with hardenable resin completely. To this end the stone was transported from the site to a pressure chamber, so that this method is not feasible with stones of very large dimensions. For the treatment of large stones on the spot it has been proposed in West Germany DE AS No. 11 73 380 to envelop the stone with a plastic foil and to suck liquid resin into the stone thus sealed by applying a vacuum. Apart from the fact that such sealing requires a high labor cost and in the case of complicated bodies is often not complete, a plastic layer will form between the foil and the stone surface, in particular in depressions, which considerably alters the outward appearance of the stone.

SUMMARY OF THE INVENTION

A porous body in a vessel is subjected to a vacuum to remove gases and moisture and then while a vacuum is applied thereto completely immersed in a hardenable impregnating liquid. While immersed a positive pressure is applied to the liquid until the body has been penetrated thereby to the desired degree and then at least part of the penetrating liquid at the body surface is removed. Thence impregnating liquid is allowed to or caused to harden.

One of the objects of this invention is to provide an improved method of increasing the strength of a porous body with an impregnating liquid in a manner that after treatment the exterior of the body remains unchanged. Another object of this invention is to provide a new and novel method of completely impregnating a stone with a hardenable liquid to increase the strength thereof at low labor costs and without considerably altering the exterior of the stone. A further object of this invention is to provide a new and novel method of the above mentioned nature that can be carried out on the spot without transporting the body to be treated.

This problem is solved according to this invention that a part of the impregnating liquid present on the surface of the body is removed before the hardening of the impregnating liquid in the body is carried out in the vessel by means of heat.

The method according to this invention not only produces complete and uniform impregnation of a porous body, all cavities in the interior of the body being filled with impregnating liquid after the hardening, so that the body is resistant to weathering, but also no alteration can be seen after the treatment of the body on the surface thereof.

An especially simple, rapid, and low-cost way of removing the impregnating liquid from the surface is to let it evaporate before the hardening. For this purpose a very thin impregnating liquid, in particular a pure monomer, e.g. a methacrylic acid ester, is particularly suitable. Alternatively or additionally, it is proposed that the impregnating liquid present at the surface of the body is washed off with a solvent. Thereby also the appearace of the body is restored to the original appearance.

For the formation of a vessel-like packing, the outer layer at least of the sides and underside of the body may be impregnated with the hardenable liquid, and after the hardening of the liquid of the outer layer, the hardenable sealing liquid, or another one, can be forced or sucked into the interior of the body for the complete impregnation thereof through at least one passage in the outer layer, which subsequently harden or is hardened.

By this method it is possible to increase the strength and resistance to weathering of impregnatable bodies outside of pressure chambers or similar expensive equipments. The body to be treated need not be moved from the site, so that the method can be applied also to bodies of very large dimensions. By the method of this invention an especially uniform complete impregnation of the body is achieved, without causing any optical alternation of the body surface.

The inlet and outlet openings required for the complete impregnation can be created in a particularly simple manner in that during the impregnation of the outer layer at least a region of the layer remains untreated as inlet for the hardenable liquid and/or at least a second region of the layer as outlet for the gases and liquids issuing from the body, e.g. water and water vapor. Alternatively it is proposed that after the impregnation and hardening of the outer layer at least one inlet for the hardenable liquid and/or at least one outlet for the gases and liquids issuing from the body are provided in said outer layer. Further it is proposed that a vacuum is applied to at least one outlet.

In case the body contains a relatively large amount of water, it is proposed that before the complete impregnation of the core with hardenable liquid the water present in the core is displaced by forcing in a volatile, non-bonding volatile, medium, such as acetone, and thereafter the medium is forced out by compressed air. Alternatively, the water present in the core may be evaporated by shortwave infrared radiation or microwaves before the complete impregnation of the core with hardenable liquid.

Hardening of the resin introduced into the core can be produced by shortwave infrared radiation, microwaves, ultrasonic waves or gamma radiation. Preferably it is proposed that the state of filling of the hardenable liquid in the core is measured by bores in the outer layer, by sensors arranged in the body, or by ultrasonic waves or infrared rays.

Figure 1:
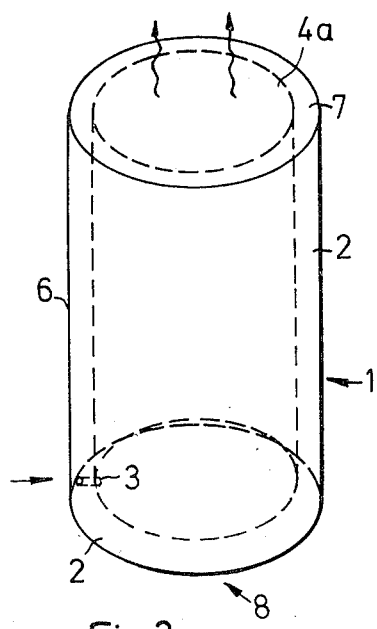
FIG. 1 shows a perspective view of a body to be treated, having a previously treated outer layer and a lower inlet and an upper exit area.

A porous stone, which is to be compacted and made resistant to weathering, is placed in a vessel and set under vacuum and heated to about 100° C. The vacuum should be as high as possible. The stone is thus degased and dried. Then, after the stone has cooled to about room temperature, while maintaining the vacuum, the impregnating liquid is charged in the vessel so that the stone is completely immersed in the impregnating liquid. The vacuum may be high enough for the impregnating liquid to stay just below the boilingpoint. As impregnating liquids are suitable solvent-free reactive resin systems, e.g. acrylates, polyesters, epoxy resins, silicone rubber resins containing a hardener which is stable up to a certain temperature, more particularly room temperature, so that the impregnating liquid will not harden below this temperature, and which when the specific temperature is exceeded, more particularly greatly exceeded, initiates the reaction of the reactive resin systems and hence their hardening. After the stone lies completely immersed in the impregnating liquid, the vessel is put under positive pressure, e.g. 15 atm (gauge). This protective pressure causes the impregnating liquid to penetrate into the porous body faster and deeper than would be possible at atmospheric pressure. As the stone had been degased before and immersed in the impregnating liquid under vacuum, atmospheric pressure would bring about only a moderately deep and slow penetration into the pores of the stone. The positive pressure is maintained for a sufficient period of time to permit a sufficiently deep penetration of the impregnating liquid into the stone. Then the impregnating liquid is drained from the vessel, the positive pressure being however maintained in the vessel. Maintenance of the positive pressure is necessary so as not to let the impregnating liquid absorbed by the stone issue from the pores of the stone. Now one lets the impregnating liquid present at the surface of the body evaporate, by holding the temperature in the hardening vessel below the reaction temperature of the impregnating liquid for awhile. Thereafter, the temperature of the atmosphere in the vessel is increased so that hardening is initiated. Instead of increasing the temperature in the vessel, a liquid which had been let into the vessel while maintaining the positive pressure in the vessel may be heated until the reaction of the impregnating liquid and hence the hardening thereof has been initiated. During the hardening the positive pressure must be maintained for the same reason. A difference—sufficient according to the invention—between the normal treatment temperature and the temperature for initiation of the hardening is about 80° C. After completed or almost completed hardening, the vessel may be relieved of its pressure. The porous and brittle stone thus treated has become firm and protected against aggressive substances, in particular against weather. After the impregnating liquid present in the stone has hardened, the stone surface can be washed off with a solvent, to take the dark coloration off the surface. This may be done alternatively or additionally to the above-mentioned evaporation of the impregnating liquid.

In case the stone has cracks and the cracks extend to the surface of the stone, the cracks are filled so that the impregnating liquid cannot flow out of these gaps. As the drained impregnating liquid does not harden by itself, it can be used for any length of time for the impregnating of porous bodies without loss of effectiveness.

In the embodiment shown in FIG. 1, the porous body 1 to be treated has a cylindrical form (e.g. a sandstone column). To achieve a complete, uniform impregnation of body 1, its shell type lateral (outer peripheral side) surfaces portion 6 and its bottom surface portion 8 are intensively impregnated with a methacrylic acid ester or grout in such a way that an outer layer (zone) 2 of sufficient thickness is completely imbibed with this liquid synthetic material. Then, by applying heat, the resin present in the outer layer is hardened (polymerized) or the resin or grout containing an accelerator harden by themselves. The outer layer 2, thereby is completely sealed, forms within the body a packing in the form of a vessel or pot, which other than for a top central portion 4a, encloses the interior (core) of the body around its outer peripheral side surface and bottom. The outer layer 2 may be formed by various methods for example the liquid synthetic material may be applied by a brush, or by the method disclosed in West Germany DE-OS No. 1,938,077 or by the procedure previously described.

At the level of the inner bottom of the vessel or pot formed by the outer layer 2, an inlet bore 3 leading from the lateral surface 6 to the interior of the body and penetrating through the outer layer is formed (for example by drilling), through which the hardenable liquid is introduced under pressure. The hardenable liquid rises inside the pot-shaped outer layer through the permeable material of the body and forces the gas present in the core as well as liquids contained therein (e.g. water) upward through an exit area 4a which has remained free in this area by non-treatment of the surface 7 with hardenable liquid. As soon as the hardenable liquid appears at the exit area 4a, supply through inlet 3 is stopped.

Figure 2:
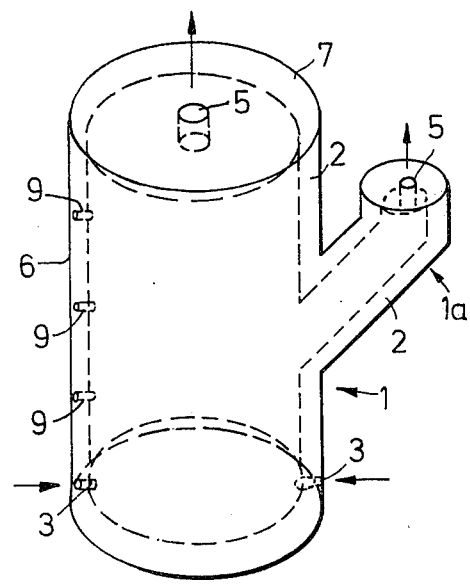
FIG. 2, a body having two lower inlets and one upper outlet for a suction connection.

In the alternative embodiment shown in FIG. 2, there are provided at the lower end of the body two pressure inlets 3 for the hardenable liquid; and in addition to the lateral (outer peripheral side) surfaces 6 and bottom 8 also the upper surface 7 of the body is treated with hardenable liquid for the formation of an outer layer 2, so that the outer layer forms a vessel closed all around the interior core. In the top surface 7 an outlet 5 is provided (for example by subsequent drilling or by nontreatment of this point). At this outlet a suction pump can be connected, to accelerate the permeation of the core with hardenable liquid. The body shown in FIG. 2 has a branch 1a, which also has a sealed outer layer enclosing the core thereof that opens to the core of the main body and at its top an outlet 3 where a suction pump may be connected.

Figure 3:
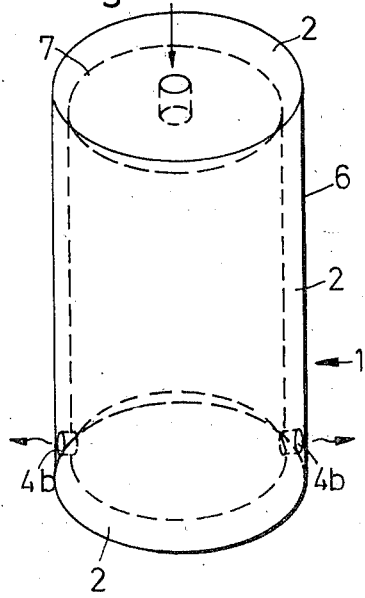
FIG. 3, a body having an upper inlet and two lower outlets.
Figure 4:
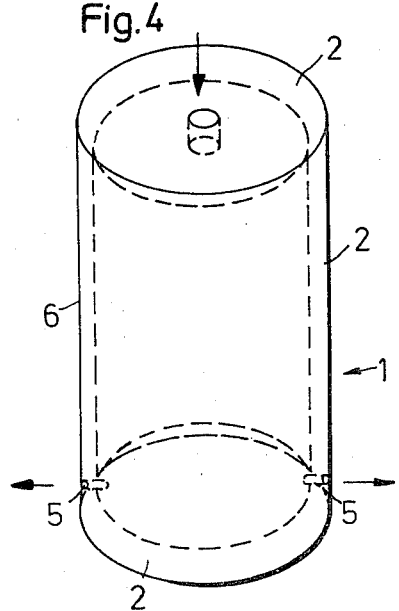
FIG. 4, a body having an upper inlet and two lower outlets for suction connections.

In the embodiment shown in FIG. 3, the core thereof is completely enclosed by a sealed outer layer which has a top inlet opening to the core so that the hardenable liquid can be forced downwardly through the core and outlets 4b at the bottom of the exit of displaced gases and liquids. The embodiment shown in FIG. 4 differs from the one shown in FIG. 3 in that a vacuum is applied at the bottom outlets, the hardenable liquid being supplied under pressure or without pressure at the upper inlet 3.

In case the outer layer of the body has cracks or holes which cannot be closed from the outside by the impregnation, these openings are filled with a synthetic composition or cement-containing composition. If the body is treated with resin, the latter may additionally contain a chemically reacting hydrophile medium which binds the water present in the body. Further, the resin may contain a bondying aid which creates a chemical union of the resin with the substances of the body. If the core contains relatively much water, prior to impregnating it with the hardenable liquid, the water is displaced by forcing in acetone, which is forced out again by compressed air, or else the water is evaporated by infrared rays or microwaves acting from the outside. Exact control of the hardening (polymerization) of the resin contained in the outer layer and in the core is achieved by shortwave infrared radiation, by microwaves, ultrasonic waves or gamma radiation.

To be able to determine the exact state of filling of the hardenable liquid rising or filling in the interior core of the body, the outer layer 2 has bores 9 (FIG. 2) arranged in it at regular intervals, which pass through the outer layer 2 and from which hardenable liquid emerges as soon as the level has reached the respective bore. Alternatively or additionally, sensors may be arranged in the body, which determine e.g. the conductivity of the material in the body. The extent of filling of the core can also be measured by ultrasonic waves or infrared rays or be represented optically. Further, there may be introduced in the hardenable liquid means which reflect, absorb or emit certain rays used for the measurement.

What is claimed is:

1. A method of increasing the strength of a porous body and its resistance to weathering comprising impregnating a portion of the outer layer of a porous body with an impregnating liquid that includes a hardenable resin and hardener to, upon the liquid hardening, form a sealed vessel-like packing, hardening the impregnating liquid in the outer layer, thereafter completely impregnating the interior of the body with an impregnating liquid that includes a hardenable resin and hardener and hardening the impregnating liquid in the body interior.

2. The method according to claim 1, characterized in that, after impregnation and hardening of the liquid in the outer layer, at least one inlet for the hardenable liquid and/or at least one outlet for the gases and liquids issuing from the body are provided in said outer layer.

3. The method according to claim 1, characterized in that a region of the outer layer is left umimpregnated during the first impregnation step to provide an inlet for the hardenable liquid during the second impregnation step and/or a region of the outer layer is left unimpregnated during the first impregnation step to provide an outlet for gases and liquids issuing from the body during the second impregnation step.

4. The method according to claim 1 characterized in that prior to the impregnation of the outer layer the porous body is placed in a vessel under vacuum to remove gases and moisture, that the first impregnation step comprises filling the vessel with the impregnating liquid to completely immerse the body while the liquid is maintained under positive pressure, and then draining the vessel while maintaining the positive pressure, that after the first impregnating step and prior to the first hardening step part of the impregnating liquid at the surface of the body is removed by heat while the body is in the vessel, and that the first hardening step is initiated by action of heat while maintaining the positive pressure in the vessel.

5. The method according to claim 4, characterized in that the impregnating liquid at the surface of the body is removed by evaporating.

6. The method according to claim 4, characterized in that the impregnating liquid present at the surface of the body is washed off with a solvent.

7. The method according to claim 3, 4, or 5, characterized in that the impregnating liquid is a methacrylic acid.

8. The method according to claim 2, or 3, characterized in that after hardening the impregnating liquid in the outer layer, a vacuum is applied to at least one outlet.

9. The method according to claim 2, 3, or 4, characterized in that, before the complete impregnation of the interior of the body with hardenable liquid, the water present in the interior of the body is displaced by forcing in a volatile, nonbonding medium, such as acetone, and thereafter the medium is forced out by compressed air.

10. The method according to claim 2, 3, or 4, characterized in that, before the complete impregnation of the interior of the body with hardenable liquid, the water present in the interior of the body is evaporated by shortwave infrared radiation or microwave.

11. The method according to claim 2, 3, or 4, characterized in that the hardening of the resin introduced into the interior of the body is procured by shortwave, infrared radiation, microwaves, ultrasonic waves, or gamma radiation.

12. The method according to claim 2, 3, or 4, characterized in that the step of filling of the hardenable liquid present in the interior of the body is measured by bores in the outer layer, by sensors arranged in the body or by ultrasonic waves or infrared rays.

13. A method of increasing the strength of a porous body and its resistance to weathering comprising impregnating the outer layer of a porous body with an impregnating liquid that includes a hardenable resin and hardener to enclose an unimpregnated core of the body, hardening the impregnating liquid in the outer layer to provide a sealed outer layer, providing an inlet in the hardened impregnated outer layer, applying an impregnating liquid that includes a hardenable resin and hardener through the inlet to completely impregnate the core and hardening the last mentioned impregnating liquid.

14. The method of claim 13 further characterized in that an outlet for gases is provided in the outlet layer and that at least one of a suction is applied to the outlet and the impregnating liquid applied through the inlet is forced under positive pressure during the second impregnating step.

15. The method of claim 13, or 14, wherein impregnating liquid is applied to the outer layer by a brush.

16. In a method of increasing the strength of a porous body and its resistance to weathering, the steps of impregnating a portion of the outer layer of a porous body with an impregnating liquid that includes a hardenable resin and hardner to form a vessel-like packing while leaving a body core unimpregnated and at least one region of the outer layer unimpregnated to provide at least one of an inlet for hardenable liquid during a second impregnating step and an outlet for gases during a second impregnating step, hardening the impregnating liquid in the outer layer, thereafter impregnating the body core with an impregnating liquid that includes a hardenable resin and hardener and hardening the last mentioned impregnating liquid.

17. A method of increasing the strength of a porous body and its resistance to weathering comprising impregnating the outer layer of at least the outer peripheral side surface portion and the bottom surface portion of the porous body with an impregnating liquid that includes a hardenable resin and a hardener while leaving an unimpregnated body core and hardening the impregnating liquid in the outer layer to form a sealed vessel-like packing, and thereafter one of sucking and forcing under positive pressure an impregnating liquid that includes a hardenable resin and a hardener through a passage in the body layer to the body core to complete the impregnation of the body and hardening the last mentioned impregnating liquid.

18. A method of increasing the strength of a porous body and its resistance to weathering comprising impregnating at least a portion of the outer layer of the porous body with a hardenable liquid that includes a hardenable resin and a hardener while leaving the interior of the body unimpregnated and hardening the above mentioned hardenable liquid to form a sealed vessel-like packing of a desired thickness, providing in the outer layer an inlet passage for a hardenable liquid to the body interior and an outlet for gases by at least one of leaving at least one portion of the outer layer unimpregnated during the above mentioned impregnating step and forming an opening through the outer layer portion that has been impregnated during the above impregnating step, and thereafter introducing a hardenable liquid that contains a hardenable resin and a hardener through the inlet to completely impregnate the body interior, the introducing step including at least one of applying a positive pressure to the last mentioned hardenable liquid and applying a suction to the outlet, and hardening the last mentioned liquid.

* * * * *